Sept. 27, 1966  R. K. STRONG  3,275,541
POLAROGRAPHIC CELL WITH MEMBRANE CLEANING MEANS
Filed March 27, 1963
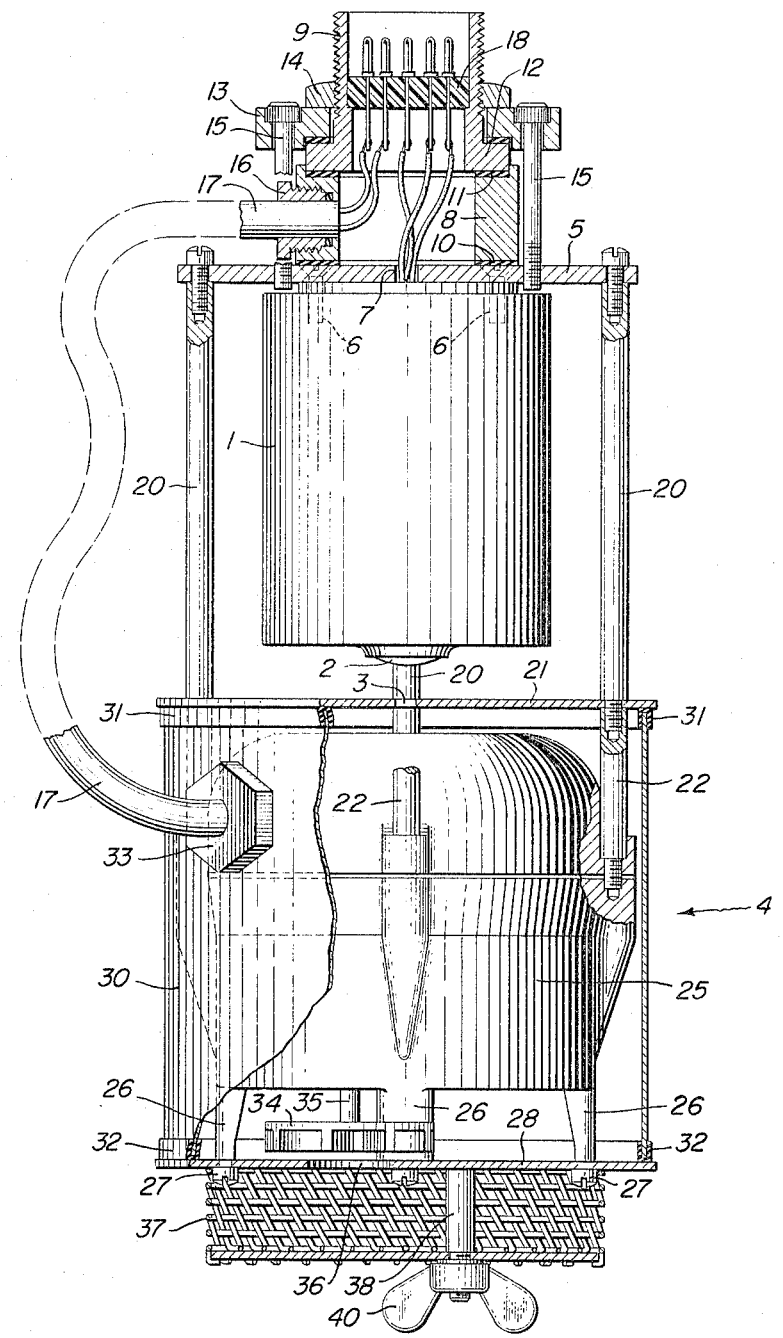
INVENTOR.
ROGER K. STRONG
BY Arthur H. Swanson
ATTORNEY.

United States Patent Office 3,275,541
Patented Sept. 27, 1966

3,275,541
POLAROGRAPHIC CELL WITH MEMBRANE CLEANING MEANS
Roger K. Strong, Doylestown, Pa., assignor to Honeywell Inc., a corporation of Delaware
Filed Mar. 27, 1963, Ser. No. 268,430
1 Claim. (Cl. 204—195)

This invention relates to disolved reducible gas measuring cells. More specifically, the present invention relates to polarographic cells.

An object of the present invention is to provide an improved polarographic cell structure.

Another object of the present invention is to provide an improved polarographic cell structure having a self-contained means for continuously cleaning a cell membrane and supplying a fresh sample of fluid to be tested.

A further object of the present invention is to provide an improved self-cleaning polarographic cell structure, as set forth herein, having a simple operation and construction.

In accomplishing these and other objects, there has been provided, in accordance with the present invention, a polarographic cell structure including a polarographic cell having a selectively permeable membrane arranged to separate a pair of internal cell electrodes from a fluid to be tested. A fluid pump is attached to the cell structure and is arranged to supply a jet of test fluid against the membrane to provide a cleaning action thereof and a continuously fresh sample of fluid to be tested. The combination of the cell and pump is arranged to be fluid-tight to allow a complete submersion of the cell structure in a fluid to be tested. A fluid-tight electrical cable means is arranged to provide electrical connections to the cell and the pump motor.

A better understanding of the present invention may be had when the following detailed description is read in connection with the accompanying drawing, in which the single figure is a pictorial cross-section of a polarographic cell structure embodying the present invention.

Referring to the single figure drawing, there is shown a polarographic cell structure including a polarographic cell 1. The cell 1 may be a device as shown and described in a co-pending application of Keyser et al., Serial No. 230,229, filed on October 12, 1962, now U.S. Patent No. 3,235,477. As shown in that application, the polarographic cell includes a selectively permeable membrane covering an opening in one end of the cell. A pair of electrodes are immersed in an electrolyte contained within the cell, and combination is separated from the fluid under test by the aforesaid membrane.

It has been found that in order to insure the inherent long term stability of the measuring property of the cell, it is desirable to have a rapid flow of test fluid past the membrane. This flow of fluid is effective to clean the surface of the membrane to prevent an accumulation of marine growth, mineral deposits, etc. Further, the flow of test fluid is effective to provide a continuously fresh sample of the fluid for testing by the cell. Thus, in a stagnent fluid, the cell has been found to consume the dissolved reducible gas at the surface of the membrane and, subsequently, provide an incorrect reading for the gas content of the fluid. The structure of the present invention is effective to provide a polarographic cell structure having a continuous fluid flow to provide a long term stability and accuracy of the polarographic cell.

The cell 1 is positioned with a cell membrane 2 at one end of the cell 1 adjacent to a fluid outlet 3 of a fluid pump structure 4. The other end of the cell 1 is suspended from a plate 5 by a plurality of screws 6 passing through the plate 5 and into the cell 1. A hole 7 in the plate 5 is provided to allow connecting wires from the cell 1 to pass therethrough. A short hollow cylinder 8 is sealed to the plate 5 and to a hollow cell structure support member 9 by deformable sealing washers 10 and 11, respectively. The support member 9 is externally threaded and is provided with a flange 12 adjacent to sealing washer 11. A plate 13 is fitted on the flange and is fastened thereto by a nut 14 threaded on member 9. A plurality of bolts 15 are arranged to connect plate 13 to plate 5. As shown, these bolts may pass through holes in the plate 13 and thread into tapped holes in plate 5. These bolts 15 are effective to compress washers 10 and 11 to seal the interior of cylinder 8 at the junctions covered by the washers.

A fluid-tight cable connector 16 is fitted to the side of cylinder 8 to provide access to the inside of cylinder 8 for a power cable 17. An electrical pin connector 18 is provided within member 9 as a disconnect coupling for the wires from cable 17 and cell 1 from a cable (not shown) used to connect associated equipment with the polarographic cell structure. A fluid-tight coupling for this cable is effected to the member 9 by any suitable means.

A plurality of studs 20 are symmetrically arranged between the plate 5 and a top cover 21 of the pump structure 4. Cap screws 22 are used to connect one end of each of the studs 20 to the plate 5. The other ends of the studs 20 are threaded and pass through holes in top cover 21 into threaded holes of one end of one of a plurality of respective studs 22. Thus, the cover 21 is retained between studs 20 and 21. The other ends of the studs 21 are threaded and are fastened into threaded holes in the outer cover of a fluid-tight motor 25. This motor 25 is arranged with a plurality of projecting legs 26 at one end thereof to form a space between the legs 26. The ends of the legs 26 have threaded holes therein to receive respective ones of a plurality of screws 27. The screws 27 pass through holes in a bottom cover 28 to clamp the cover 28 against the ends of the legs 26. A cylindrical shell 30 is positioned between the covers 21 and 28 and sealed thereto by U-shaped gaskets 31 and 32, respectively.

A fluid-tight cable connector 33 is passed through the shell 30 into the motor 25 to provide a motor connection for the cable 17. The fluid pumping action of the pump 4 is effected by a fluid impeller 34 which is attached to a motor shaft 35 projecting into the space between the legs 26. A fluid inlet hole 36 is positioned in the cover 28 substantially in axial alignment with the impeller 34. The incoming test fluid is filtered by a fluid filter screen 37 arranged to surround the inlet 26 on the outside surface of the cover 28. The screen 37 is attached to a stud 38, mounted on the cover 28, by a thumb nut 40 to permit easy removal of the screen for cleaning thereof.

The shell 30 is spaced from the motor 25 to provide a fluid space therebetween. Thus, the test fluid is pumped by the impeller 34 from the inlet 26 through the aforesaid space and out of the fluid outlet 3. The fluid outlet 3 is spaced from the cell membrane 2 to provide a continuous jet of test fluid against the membrane 2. This jet of test fluid is effective to clean the membrane 2 and to provide a continuously fresh sample of fluid to be tested. The entire cell structure of the present invention may be immersed in a fluid to be tested; e.g., a body of water such as a stream or river. In such an application, the impeller 34 is effective to pump the river water against the membrane 2 to test the content of dissolved reducible gas by the polarographic cell 1.

Accordingly, it may be seen that there has been provided, in accordance with the present invention, an improved polarographic cell structure having a self-contained means for cleaning a cell membrane while providing a continuously fresh sample of fluid to be tested.

What is claimed is:

A polarographic cell structure comprising a polarographic cell having a pair of internal electrodes immersed in an electrolyte and a selectively permeable membrane separating said electrodes and said electrolyte from a liquid to be tested, a submersible pump means adapted for operation while submerged in the liquid to be tested, said pump means being attached to said cell including a motor means, a fluid impeller driven by said motor means, a pump enclosure housing said motor means and said impeller and having a fluid inlet and outlet, said outlet being positioned in spaced relation from but closely adjacent to the outside surface of the membrane, the outlet being positioned also in substantial axial alignment with said membrane to direct a stream of pumped test liquid against an outside surface of said membrane, and fluid tight connecting means operative to provide electric connections from associated equipment to said cell and said pump means.

References Cited by the Examiner

UNITED STATES PATENTS

| | | | |
|---|---|---|---|
| 2,108,293 | 2/1938 | Perley | 204—195 |
| 2,585,811 | 2/1952 | Marks | 204—195 |
| 2,733,201 | 1/1956 | Thompson | 204—195 |
| 3,000,805 | 9/1961 | Carritt et al. | 204—195 |
| 3,216,915 | 11/1965 | Arthur et al. | 204—195 |

FOREIGN PATENTS 695,776   8/1953   Great Britain.

JOHN H. MACK, *Primary Examiner.*

T. TUNG, *Assistant Examiner.*